United States Patent
Ginzburg et al.

(10) Patent No.: US 9,720,730 B2
(45) Date of Patent: Aug. 1, 2017

(54) PROVIDING AN ASYMMETRIC MULTICORE PROCESSOR SYSTEM TRANSPARENTLY TO AN OPERATING SYSTEM

(75) Inventors: Boris Ginzburg, Haifa (IL); Ilya Osadchiy, Haifa (IL); Ronny Ronen, Haifa (IL); Eliezer Weissmann, Haifa (IL); Michael Mishaeli, Zichron Yaakov (IL); Alon Naveh, Ramat Hasharon (IL); David A. Koufaty, Portland, OR (US); Scott D. Hahn, Beaverton, OR (US); Tong Li, Portland, OR (US); Avi Mendleson, Haifa (IL); Eugene Gorbatov, Portland, OR (US); Hisham Abu-Salah, Majdal Shams (IL); Dheeraj R. Subbareddy, Hillsboro, OR (US); Paolo Narvaez, Wayland, MA (US); Aamer Jaleel, Hudson, MA (US); Efraim Rotem, Haifa (IL); Yuval Yosef, Hadera (IL); Anil Aggarwal, Portland, OR (US); Kenzo Van Craeynest, Waregem (BE)

(73) Assignee: Intel Corporation, Santa Clara, CA (US)

( * ) Notice: Subject to any disclaimer, the term of this patent is extended or adjusted under 35 U.S.C. 154(b) by 824 days.

(21) Appl. No.: 13/995,994

(22) PCT Filed: Dec. 30, 2011

(86) PCT No.: PCT/US2011/068008
§ 371 (c)(1),
(2), (4) Date: Nov. 22, 2013

(87) PCT Pub. No.: WO2013/101139
PCT Pub. Date: Jul. 4, 2013

(65) Prior Publication Data
US 2014/0082630 A1    Mar. 20, 2014

(51) Int. Cl.
*G06F 9/46* (2006.01)
*G06F 9/50* (2006.01)
(Continued)

(52) U.S. Cl.
CPC ........ *G06F 9/4881* (2013.01); *G06F 9/30101* (2013.01); *G06F 9/4856* (2013.01);
(Continued)

(58) Field of Classification Search
CPC . G06F 9/46; G06F 9/50; G06F 9/4881; G06F 9/30101; G06F 9/4856;
(Continued)

(56) References Cited

U.S. PATENT DOCUMENTS 5,257,375 A    10/1993  Clark et al.
5,895,487 A *   4/1999  Boyd .................. G06F 12/0817
                                                  711/122
(Continued)

FOREIGN PATENT DOCUMENTS

CN       101790709 A       7/2010
WO       2006/074027       7/2006
WO       2006/074027       8/2006

OTHER PUBLICATIONS

Tong Li et al. ("operating system support for overlapping ISA heterogeneous multi-core architectures", IEEE, 2009, pp. 1-12).*

(Continued)

*Primary Examiner* — Meng An
*Assistant Examiner* — Caroline H Arcos
(74) *Attorney, Agent, or Firm* — Trop, Pruner & Hu, P.C.

(57) ABSTRACT

In one embodiment, the present invention includes a multicore processor with first and second groups of cores. The second group can be of a different instruction set architecture (ISA) than the first group or of the same ISA set but having different power and performance support level, and is trans- (Continued)

parent to an operating system (OS). The processor further includes a migration unit that handles migration requests for a number of different scenarios and causes a context switch to dynamically migrate a process from the second core to a first core of the first group. This dynamic hardware-based context switch can be transparent to the OS. Other embodiments are described and claimed.

20 Claims, 9 Drawing Sheets

(51) Int. Cl.
  *G06F 9/48* (2006.01)
  *G06F 9/30* (2006.01)
  *G06F 15/78* (2006.01)
(52) U.S. Cl.
  CPC ...... *G06F 15/7807* (2013.01); *Y02B 60/1207* (2013.01); *Y02B 60/1225* (2013.01); *Y02B 60/144* (2013.01); *Y02B 60/162* (2013.01)
(58) Field of Classification Search
  CPC ............ G06F 15/7807; Y02B 60/1207; Y02B 60/1225; Y02B 60/144; Y02B 60/162
  See application file for complete search history.

(56) References Cited

U.S. PATENT DOCUMENTS

| | | | |
|---|---|---|---|
| 6,076,157 A * | 6/2000 | Borkenhagen | G06F 9/4825 712/228 |
| 6,434,590 B1 | 8/2002 | Blelloch et al. | |
| 7,149,878 B1 * | 12/2006 | Jensen | G06F 9/30076 712/209 |
| 7,376,954 B2 | 5/2008 | Kissell | |
| 7,451,146 B2 | 11/2008 | Boehm | |
| 7,461,275 B2 | 12/2008 | Belmont et al. | |
| 8,881,162 B2 * | 11/2014 | An | G06F 12/0261 709/226 |
| 2004/0215987 A1 | 10/2004 | Farkas et al. | |
| 2005/0081203 A1 | 4/2005 | Aguilar et al. | |
| 2006/0075404 A1 | 4/2006 | Rosu et al. | |
| 2006/0150184 A1 | 7/2006 | Hankins | |
| 2007/0079301 A1 * | 4/2007 | Chinya | G06F 9/3009 717/151 |
| 2007/0101174 A1 | 5/2007 | Tsukimori et al. | |
| 2007/0157211 A1 * | 7/2007 | Wang | G06F 9/30181 719/313 |
| 2007/0266264 A1 | 11/2007 | Lewites et al. | |
| 2008/0229306 A1 * | 9/2008 | Omori | G06F 9/505 718/100 |
| 2008/0263324 A1 | 10/2008 | Sutardja et al. | |
| 2009/0165014 A1 * | 6/2009 | Park | G06F 9/5088 718/105 |
| 2009/0222654 A1 * | 9/2009 | Hum | G06F 13/24 713/100 |
| 2009/0319712 A1 | 12/2009 | Pudipeddi et al. | |
| 2010/0005474 A1 | 1/2010 | Sprangle et al. | |
| 2011/0271079 A1 | 11/2011 | Rymarczyk et al. | |
| 2012/0260067 A1 * | 10/2012 | Henry | G06F 9/30076 712/200 |

OTHER PUBLICATIONS

Taiwan Patent Office, Office Action mailed Sep. 1, 2014, in Taiwan Application No. 101149549.
Wang, et al., "Helper Threads via Virtual Multithreading on an Experimental Itanium 2 Processor-based Platform," Oct. 9-13, 2004, pp. 144-155.
Takao Moriyama, et al., "A Multiprocessor Resource Management Scheme Which Considers Program Grain Size," IPSJ Research Report, Jul. 18, 1990, vol. 90, N. 60, pp. 103-108.
Dai Honda, et al., "An Efficient Caching Technique Using Speculative Threads on Hyper-Threading Technology," IPSJ Research Report, Jul. 31, 2004, vol. 2004, No. 80, pp. 43-48.
Deborah T. Marr, et al., "Hyper-Threading Technology Architecture and Microarchitecture," Intel Technology Journal Q1, Feb. 14, 2002, vol. 6, Issue 2, pp. 4-15.
P. Agnihotri, et al., The Penn State Computing Condominium Scheduling System, Conference on Nov. 7-13, 1998, pp. 1-30.
S. Goel, et al., "Distributed Scheduler for High Performance Data-Centric Systems," IEEE Tencon 2003, pp. 1-6.
Chang-Qin Huang, et al., "Intelligent Agent-Based Scheduling Mechanism for Grid Service," Aug. 26-29, 2004, pp. 1-6.
Rakesh Kumar, et al., "Single-ISA Heterogeneous Multi-Core Architectures: The Potential for Processor Power Reduction," Dec. 2003, pp. 1-12.
Daniel Shelepov, et al., "HASS: A Scheduler for Heterogeneous Multicore Systems," 2009, pp. 1-10.
Tong Li, et al., Operating System Support for Overlapping-ISA Heterogeneous Multi-core Architectures, pp. 1-12, 2009.
Philip M. Wells, et al., "Dynamic Heterogeneity and the Need for Multicore Virtualization," 2007, pp. 1-10.
International Searching Authority, "Notification of Transmittal of the International Search Report and the Written Opinion of the International Searching Authority," mailed Sep. 28, 2012, in International application No. PCT/US2011/068008.
U.S. Appl. No. 13/992,361, filed Jun. 7, 2013, entitled, "Power Efficient Processor Architecture," by Andrew J. Herdrich.

* cited by examiner

PROVIDING AN ASYMMETRIC MULTICORE PROCESSOR SYSTEM TRANSPARENTLY TO AN OPERATING SYSTEM

BACKGROUND

Modern processors are often implemented with multiple cores. Typically, all of these cores are of a homogenous nature. That is, each core is of an identical design and thus has an identical layout, implements the same instruction set architecture (ISA), and so forth. In turn, an operating system (OS) of a system including the processor can select any of these multiple cores to handle tasks.

As time progresses, processors are being introduced with heterogeneous resources. Oftentimes these resources are specialized accelerators to perform specialized tasks. However, it is anticipated that processors will be introduced that include heterogeneous cores that have different characteristics. An OS that is designed for a symmetric system cannot be used with such a processor. Accordingly, there is a requirement to design a specialized OS to interface with an asymmetric processor. Thus regardless of whether a system is a so-called single ISA system having cores of identical ISA but having different performance levels or a system with cores having different ISAs, the OS or other supervisor software such as a hypervisor is aware of the topology including all core resources and thus schedules tasks to the appropriate type of core.

DETAILED DESCRIPTION

In various embodiments a multicore processor can include heterogeneous resources including cores having heterogeneous capabilities, for example, with different instruction set architectures (ISAs). Furthermore, the heterogeneous nature of these resources can be maintained transparently to an operating system (OS). To this end, embodiments provide a hardware-based mechanism to control allocation of tasks to the different resources in a manner that is transparent to the OS. In this way, embodiments can take advantage of the features of the different resource types to efficiently perform instructions with reduced power consumption and improved execution speeds. Embodiments are directed to processor architectures and hardware support that provide for resources to be used transparently to an operating system, and thus avoid the need to enable a heterogeneous processor or other resource to be supported by the operating system or hypervisor.

By integrating large cores with a rich ISA and high single thread performance and small cores with a smaller ISA and higher power efficiency, overall power efficiency of a processor can be increased without sacrificing performance. This processor can be an asymmetric multiprocessor, namely an OS-transparent asymmetric multiprocessor (AMP) system, details of which are described below. In various embodiments having such a heterogeneous architecture, control between the cores can be realized without OS support in a system in which the OS is for a homogeneous environment. Embodiments may further enable fast, transparent (to OS) switch of code execution between the different types of cores.

In various embodiments, only a single core type can be exposed to the OS, which may be a legacy OS, with one or more other core types present in the processor remaining completely hidden from the OS. Although described as cores, understand that in various embodiments other processing engines such as fixed function units, graphics units, physics units and so forth may also be transparent to the OS. For purposes of discussion, assume that the large core type is exposed to the OS. Accordingly, the OS schedules processes to one or more of these large cores. The re-assignment of processes to the transparent cores, and related to it process migration between cores, can be done by, e.g., dedicated hardware within the processor. Note that as used herein, a process migration may generally refer to migration of an execution context between cores or other resources.

In one embodiment, this hardware unit may be referred to as a remap and migration unit (RMU), which remaps and migrates processes between cores transparently to the OS. In various embodiments, the RMU can assign tasks to physical cores, thus maintaining transparency of the actual hardware structure with respect to the OS. In some embodiments, the RMU can be configured to communicate with an advanced programmable interrupt controller (APIC) of the processor to thus provide virtualization between a virtual core to which the OS allocates a task and a physical core on which the task is actually executing. To this end, in some embodiments the APIC can receive process allocations from the OS which include a core identifier (which in some embodiments can be in the form of an APIC ID) and initially assigns the task using an APIC ID-to-core ID mapping table to a core visible to the OS, e.g., a full ISA core. Then, the RMU can cause a migration of this process to a core that is not visible to the OS, e.g., a limited ISA core and reflect the switch by interfacing with the APIC to update the mapping table of the APIC. Thus the RMU may replace under the hood the physical core that the OS controls. As part of this replacement, the RMU can update the APIC mapping in order to hide from the OS the fact that the physical cores were replaced.

Although the scope of the present invention is not limited in this regard, in some embodiments the RMU can cause a process migration between cores mainly based on following factors: supported ISA, code performance requirements, operating system performance requests, and availability of physical resources like power and thermal. Note that the RMU can stop a process execution on one core and migrate it to another physically different core at any time during a process life.

Figure 1:
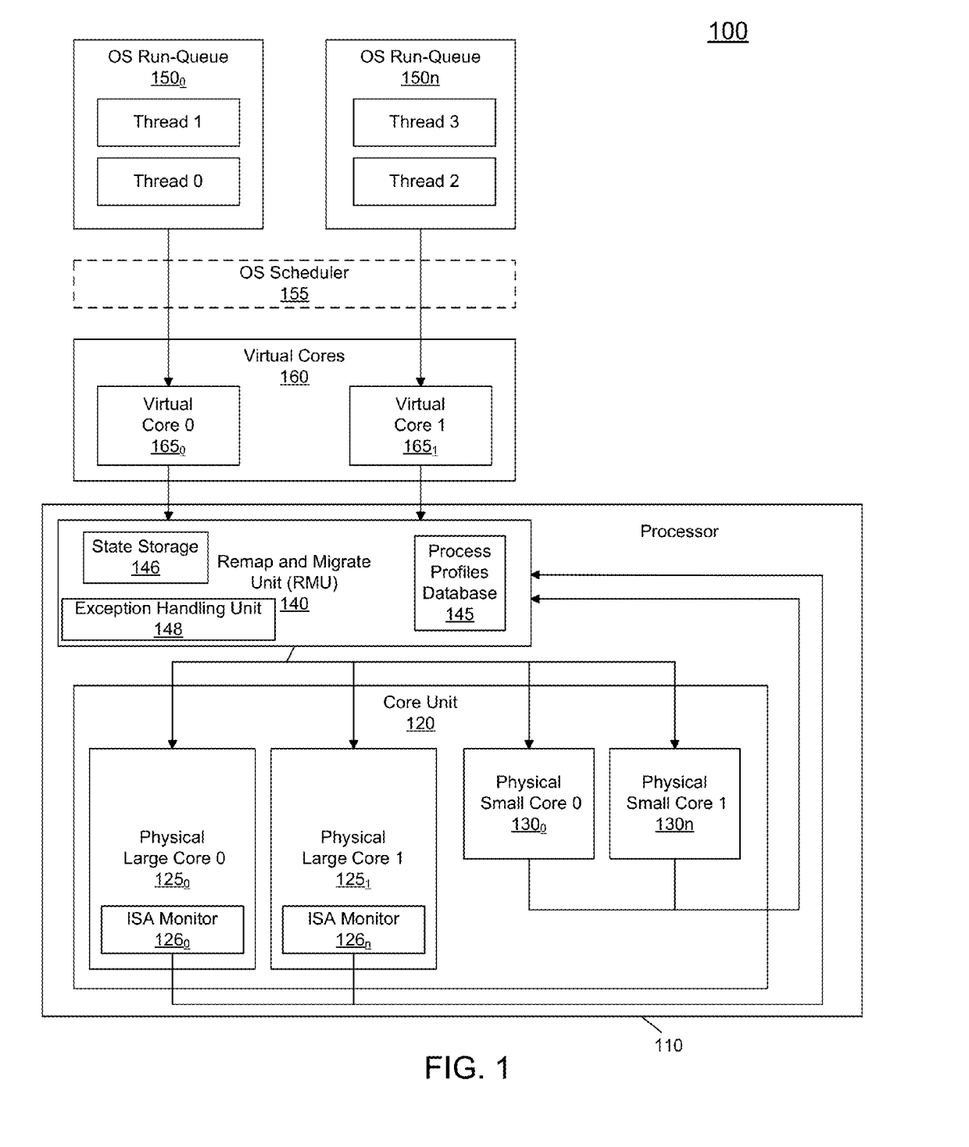
FIG. 1 is a block diagram of a system arrangement in accordance with an embodiment of the present invention.

Referring now to FIG. 1, shown is a block diagram of a system arrangement in accordance with an embodiment of the present invention. As shown in FIG. 1, system 100 includes both hardware and software. Namely, a processor 110 is present. In various embodiments, this processor can be a multicore processor that includes a core unit 120 having heterogeneous resources. Specifically in the embodiment of FIG. 1, different types of hardware or physical cores can be present, including a plurality of so-called large cores $125_0$-$125_1$ (generically large core 125), and a plurality of so-called small cores $130_0$-$130_1$ (generically small core 130). These different core types can execute different ISAs, and can be physically disparate in size and available resources. In some embodiments, the different ISAs can be realized as a given instruction set architecture and a subset of this instruction set architecture. For example, large cores 125 can execute all instructions of an ISA, while small cores 130, which may have a lesser number of architectural and micro-architectural resources including different/smaller register structures, execution units and so forth, can only execute a subset of the ISA. In this way, the different ISAs can partially overlap. In other embodiments, the ISAs to be handled by the different core types can be completely different.

As further seen in FIG. 1, processor 110 further includes an RMU 140. In various embodiments RMU 140 may be a hardware-based logic that can receive incoming thread allocations from the OS and map such allocations onto one or more of the cores. The OS allocations are done to a given virtual core that can either be a large or small core depending upon the implementation. In general, only one type of core is visible to the OS. Note that this mapping and the switching of processes between the different cores can be done much faster (and at higher frequencies) than an OS context switch. For example, an OS-triggered context switch can occur approximately one per millisecond (ms), while hardware-triggered context switches can occur approximately every 10 microseconds (μs).

In the embodiment shown in FIG. 1, RMU 140 can include a process profile database 145, as will be discussed further below. In addition, RMU 140 can include a state storage 146 that can be leveraged to communicate state between the different core types during context switches that may occur during execution. In addition, RMU 140 can include an exception handling unit 148 to handle exceptions occurring on one or more of the cores. In this way, these exceptions can be handled directly in the hardware of the processor in a much faster manner than in an exception handler of an OS. This exception handling unit can be configured to handle exceptions that occur as a result of executing a thread on a different type of core than a core to which the thread was allocated by the OS. In this way, the heterogeneous nature of the processor remains transparent to the OS.

As seen, large cores 125 each can include a corresponding ISA monitor 126, details of which will be discussed further below. In general, large cores 125 can include various components such as front end units, execution units, back end units, cache memories, power control circuitry and so forth. Note that small cores 130 can include similar circuitry including an ISA monitor, although it may be configured for a more limited width of operands, may not include vector support, out-of-order execution or so forth.

As further seen in FIG. 1, a software view of system 100 is also provided. Specifically, system 100 can execute an OS that is designed for a symmetric processor and can be used with processor 110 although the processor is of an asymmetric design. This asymmetry can be hidden from the OS via RMU 140 using mechanisms as described herein by enabling the OS to control only a single core type, and by making only single types of cores visible for the OS control.

As seen, the software portion of system 100 can include multiple OS run queues $150_0$-$150_n$ (generically run queues 150). Each queue can include multiple threads, e.g., scheduled by an OS scheduler 155. As seen, OS scheduler 155 has a view of the hardware of processor 110 that includes virtual large cores $165_0$-$165_1$, e.g., corresponding to large cores $125_0$ and $125_1$. That is, the small cores remain transparent to the OS. Note that in other implementations, the OS may have a virtual view of the small cores and the large cores can remain transparent to the OS. In general, the OS will enumerate only a single type of core. Without loss of generality the examples described herein assume either two different die size of core type, with or without the same ISA support. Embodiments may also include a processor including two or more types of cores, while the difference between the cores may not necessarily be the die size of the cores or the group of ISA that each core supports.

Using the arrangement in FIG. 1, the software provides threads to be executed within processor 110. More specifically, via OS scheduler 155 threads, e.g., 0 and 1 of OS run queue $150_0$, can be scheduled to virtual core $165_0$, which the OS associates with large core $125_0$ and the threads 2 and 3 of run queue $150_n$ can be scheduled to virtual core $165_n$, which the OS associates with large core $125_1$. Although shown with this particular implementation in the embodiment of FIG. 1, understand the scope of the present invention is not limited in this regard.

Figure 2:
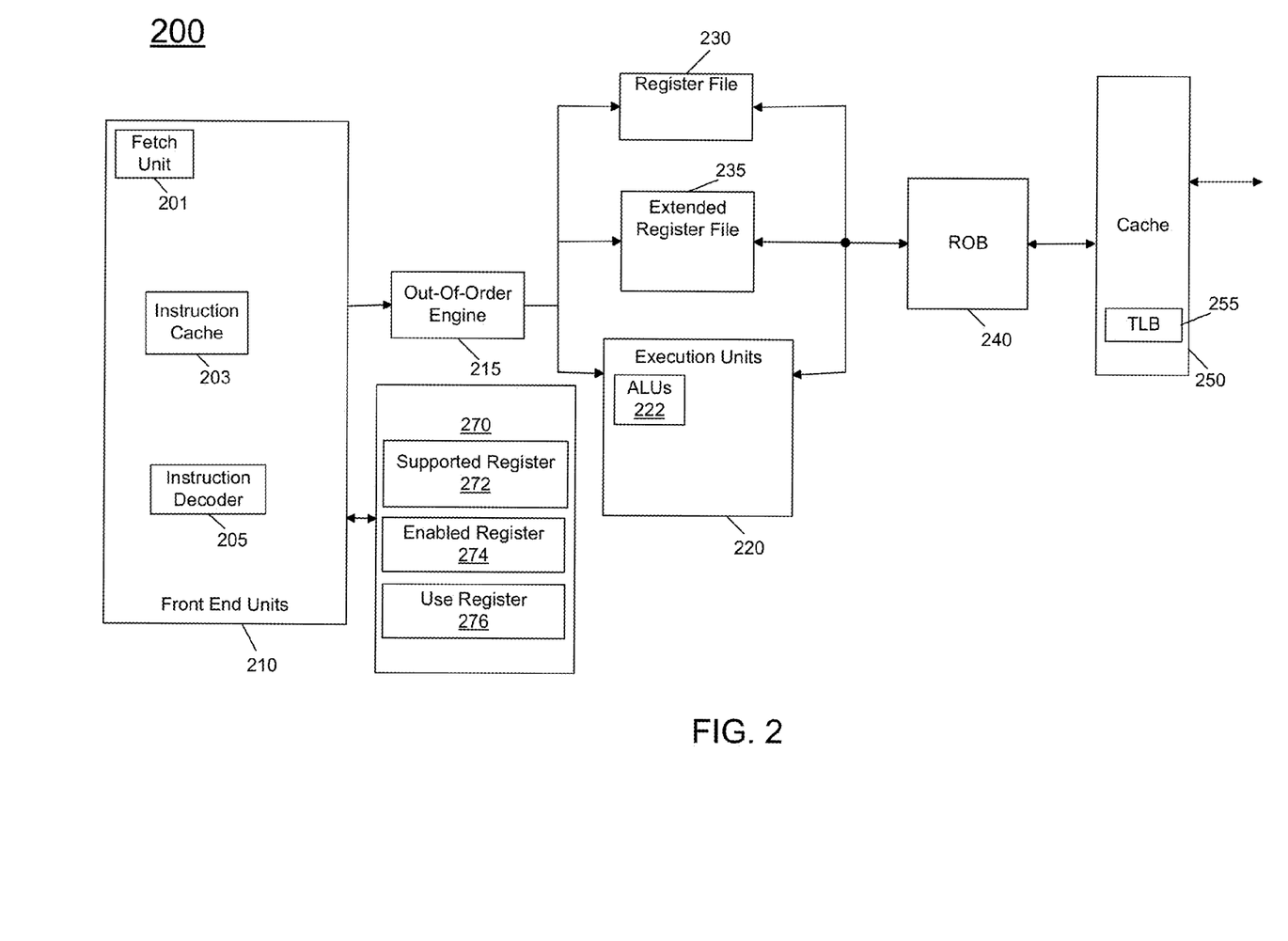
FIG. 2 is a block diagram of a processor core in accordance with one embodiment of the present invention.

Embodiments can be implemented in many different processor types. For example, embodiments can be realized in a processor such as a multicore processor. Referring now to FIG. 2, shown is a block diagram of a processor core in accordance with one embodiment of the present invention. As shown in FIG. 2, processor core 200 may be a multi-stage pipelined out-of-order processor. Processor core 200 is shown with a relatively simplified view in FIG. 2 to illustrate various features used in connection with dynamic hardware context switching in accordance with an embodiment of the present invention.

As shown in FIG. 2, core 200 includes front end units 210, which may be used to fetch instructions to be executed and prepare them for use later in the processor. For example, front end units 210 may include a fetch unit 201, an instruction cache 203, and an instruction decoder 205. In some implementations, front end units 210 may further include a trace cache, along with microcode storage as well as a micro-operation storage. Fetch unit 201 may fetch macro-instructions, e.g., from memory or instruction cache 203, and feed them to instruction decoder 205 to decode them into primitives such as micro-operations for execution by the processor.

As seen, front end units 210 can be coupled to a register array 270, which can include various registers or other storage structures to maintain information for use in hardware-based context switches in accordance with an embodiment of the present invention. As shown in FIG. 2, this register array 270 can include a supported register 272, an enabled register 274, and a use register 276. In various embodiments, supported register 272 can be implemented as a bit vector including multiple fields each to indicate whether a given hardware feature is supported within the core. In one embodiment, each such bit can be set to a logic high state if so, and otherwise the bit can be set to 0. Enabled register 274 can be used to similarly indicate whether a corresponding feature is enabled for operation. For example, certain features can be enabled during execution of a first process, but disabled during execution of another process. Finally, use register 276 can include, e.g., multiple bits each to indicate whether a given ISA is being used during execution of a process. For example, each bit can represent a family type of ISA such as advanced vector extension (AVX) instruction set extensions of an Intel™ architecture (IA) processor (AVX 1, 2, 3).

Coupled between front end units 210 and execution units 220 is an out-of-order (OOO) engine 215 that may be used to receive the micro-instructions and prepare them for execution. More specifically OOO engine 215 may include various buffers to re-order micro-instruction flow and allocate various resources needed for execution, as well as to provide renaming of logical registers onto storage locations within various register files such as register file 230 and extended register file 235. Register file 230 may include separate register files for integer and floating point operations. Extended register file 235 may provide storage for vector-sized units, e.g., 256 or 512 bits per register.

Various resources may be present in execution units 220, including, for example, various integer, floating point, and single instruction multiple data (SIMD) logic units, among other specialized hardware. For example, such execution units may include one or more arithmetic logic units (ALUs) 222.

When operations are performed on data within the execution units, results may be provided to retirement logic, namely a reorder buffer (ROB) 240. More specifically, ROB 240 may include various arrays and logic to receive information associated with instructions that are executed. This information is then examined by ROB 240 to determine whether the instructions can be validly retired and result data committed to the architectural state of the processor, or whether one or more exceptions occurred that prevent a proper retirement of the instructions. Of course, ROB 240 may handle other operations associated with retirement.

As shown in FIG. 2, ROB 240 is coupled to cache 250 which, in one embodiment may be a low level cache (e.g., an L1 cache) and which may also include TLB 255, although the scope of the present invention is not limited in this regard. From cache 250, data communication may occur with higher level caches, system memory and so forth.

Note that while the implementation of the processor of FIG. 2 is with regard to an out-of-order machine such as of a so-called x86 ISA architecture, the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry. Also understand that the core of FIG. 2 may be a large core, and a lesser number of components, widths, and so forth may be present in the small cores.

Figure 3:
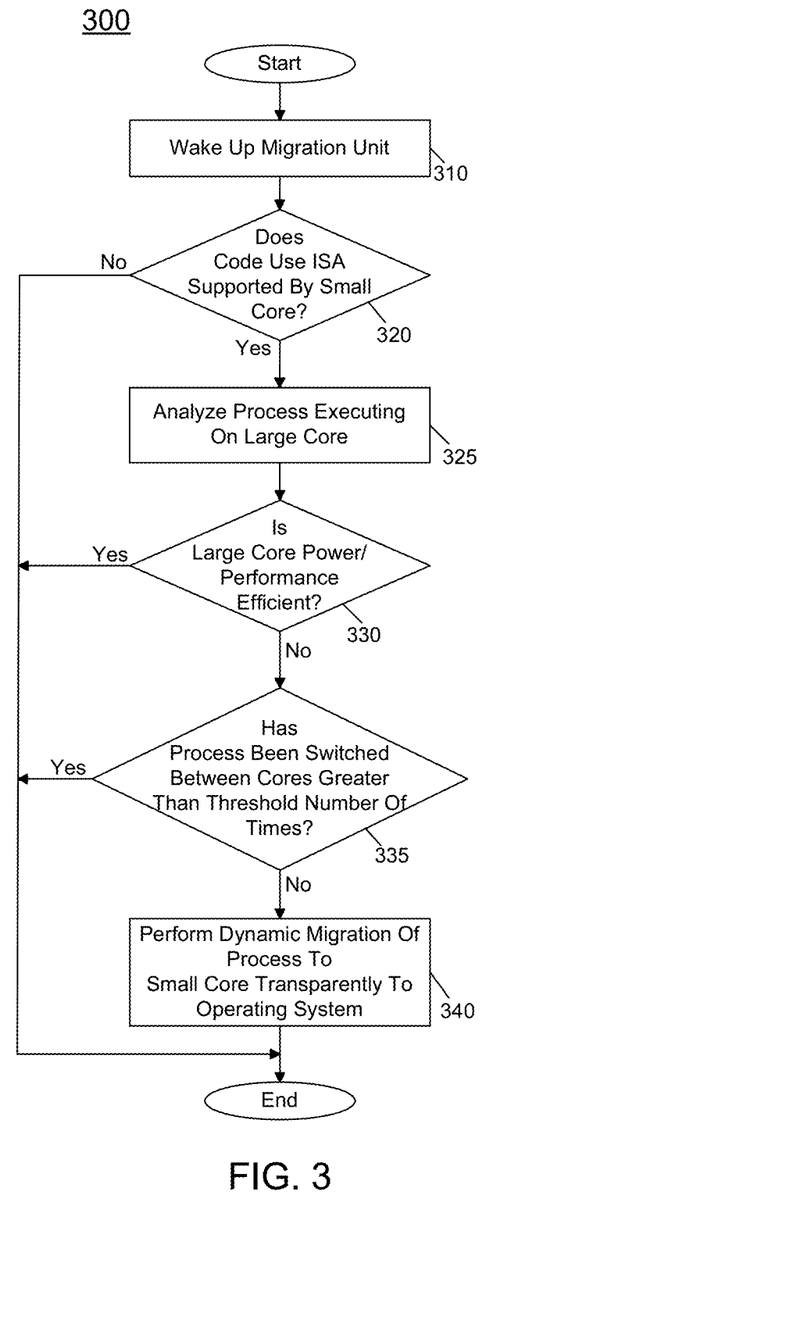
FIG. 3 is a flow diagram of a method of performing a migration from a large core to a small core in accordance with an embodiment of the present invention.

As described above, different hardware can be provided to enable migrations to be performed in accordance with an embodiment of the present invention. Referring now to FIG. 3, shown is a flow diagram of a method of performing a migration from a large core to a small core in accordance with an embodiment of the present invention. As shown in FIG. 3, method 300 may begin at block 310 by waking up a migration unit. That is, the migration unit, which may correspond to RMU 140 in FIG. 1, can be controlled to periodically power on to determine whether one or more migrations are appropriate. Also the unit can be triggered to wake-up responsive to receipt of an interrupt, such as a triggering of a fault or exception. As such, the trigger to wakeup the migration unit can be a synchronous trigger such that the migration unit periodically wakes up to determine whether a switch of a process from one type of core to another is appropriate, or an asynchronous trigger. An example for such migration is as a result of an execution exception in one type of core, the second type of core will wake up either to handle the exception or retry execution of the excepted code. One of the possible exceptions that may used in this type of mechanism is an undefined instruction exception. Although the scope of the present invention is not limited in this regard, such asynchronous triggers can be responsive to an interrupt resulting from an OS or power management controller to cause a change in a performance state of a core. In this regard, persons of skill in the art understand that a processor such as a multicore processor can operate in one of multiple performance states. In one embodiment, an OS can issue a request to change a performance state or so-called P-state of a core via a request to a power control unit (PCU) of the processor. In turn responsive to this request, the PCU, as part of its performance state control logic, can trigger an asynchronous interrupt to the migration unit.

Note that the performance state can be according to an OS-based mechanism, namely the Advanced Configuration and Platform Interface (ACPI) standard (e.g., Rev. 3.0b, published Oct. 10, 2006). According to ACPI, a processor can operate at various power and performance states or levels. With regard to power states, ACPI specifies different power consumption states, generally referred to as so-called C1 to Cn states. When a core is active, it runs at a so-called C0 state, and when the core is idle it may be placed in a core low power state, a so-called core non-zero C-state (e.g., C1-C6 states). In addition to these power states, a processor can further be configured to operate at one of multiple performance states, namely from P0 to PN. In general, the P1 performance state may correspond to the highest guaranteed performance state that can be requested by an OS. In general the different P-states correspond to different operating frequencies at which a core can run.

Increasing the performance or efficiency of code execution can be defined by minimizing the amount of time that it takes to complete a defined amount of work. Increasing the performance efficiency mostly causes consumption of more power, while saving power typically has a negative effect on the performance efficiency.

Increasing the power/performance efficiency of code execution can be defined by minimizing the ratio between the energy that is consumed to complete a defined amount of work and the execution time that it takes to execute this work. For example saving power but still executing the same amount of work or minimizing the time to execute the same amount of work without increasing the power consumption increases the power/performance efficiency. Embodiments may be used to increase the power/performance efficiency.

In the context of method 300, assume the migration unit wakes up responsive to an established interval. Next it can be determined at diamond 320 whether the code uses an ISA supported by the small core. To make this determination, the migration unit can access a use register of the large core to determine whether code of the process that has been executed uses only a subset of the large core's ISA that is supported by the small core. If so, at block 325 a process executing on the large core can be analyzed. For example, performance monitors of the core can be analyzed to determine the process's performance on the current core and a prediction of its performance on a different core. As an example, such performance metrics to be analyzed can include a number of clocks the core was stalled because of main memory access, number of core instructions per clock, or so forth.

Based on these performance metrics analyzed, control passes to diamond 330 where it can be determined whether the large core is being power/performance efficient enough (as described above) to execute the code, or whether it may be more efficient to migrate the code to the small core. Although the scope of the present invention is not limited in this regard it can be determined that the large core is being underutilized if an instruction per cycle (IPC) count for the large core is below a threshold level, as examples. Or, it can be determined that the large core is being underutilized due to a memory bandwidth limitation, e.g., due to latency associated with multiple misses within the cache structure of the core. Other examples of performance metrics used to determine a core's utilization level can include estimating which core will be more efficient to execute the current code. In other words, the RMU can attempt to estimate the performance on a second type of core by measuring performance on another type of core. Another trigger to the RMU can be an operating system performance level request, like an ACPI P-state request.

If it is determined that the large core is not being underutilized (in other words, the large core is power/performance efficient) and instead the system is benefiting from the greater performance abilities of the large core, method 300 can terminate for this evaluation interval. Otherwise, if it is determined that the large core is being underutilized such that performance is not efficient, and thus performance would not be unduly impacted by having the process run on a small core, control passes to diamond 335, where it can be determined whether the process has been switched between the cores greater than a threshold number of times. If this count value exceeds a threshold, this indicates that for some reason the process continues to be switched back to the large core from the small core (e.g., for execution of instructions of the code not supported by the small core). The control switch threshold can be changed dynamically based on the system power and performance requirement and the expectation for better or less power/performance efficiency. Accordingly, the overhead incurred in performing the migration may not be worth the effort and thus, method 300 can be terminated without performing a process migration.

On top of the performance metric that is used by the RMU to decide which type of core is to be used, the RMU is also aware of the current physical constraints like thermal or power budgets that may limit the amount of time that it is possible to use the large core, and to migrate code from the large core to the small core even if the performance metric still justifies working on the large core. Also the reverse dynamic change in constraints above may trigger a switch from the small core to the large core during the run time of the executed code.

Otherwise, control passes to block 340 where a dynamic migration of the process can be performed to thus cause the process to execute on the small core. In accordance with various embodiments, this context switch can be transparent to the OS. Various operations with regard to this dynamic migration will be discussed further below, but in general constitute saving a state of the large core and providing at least that portion of the state for use in the process to the identified small core. Although shown with this particular implementation in the embodiment of FIG. 3, understand the scope of the present invention is not limited in this regard.

Figure 4:
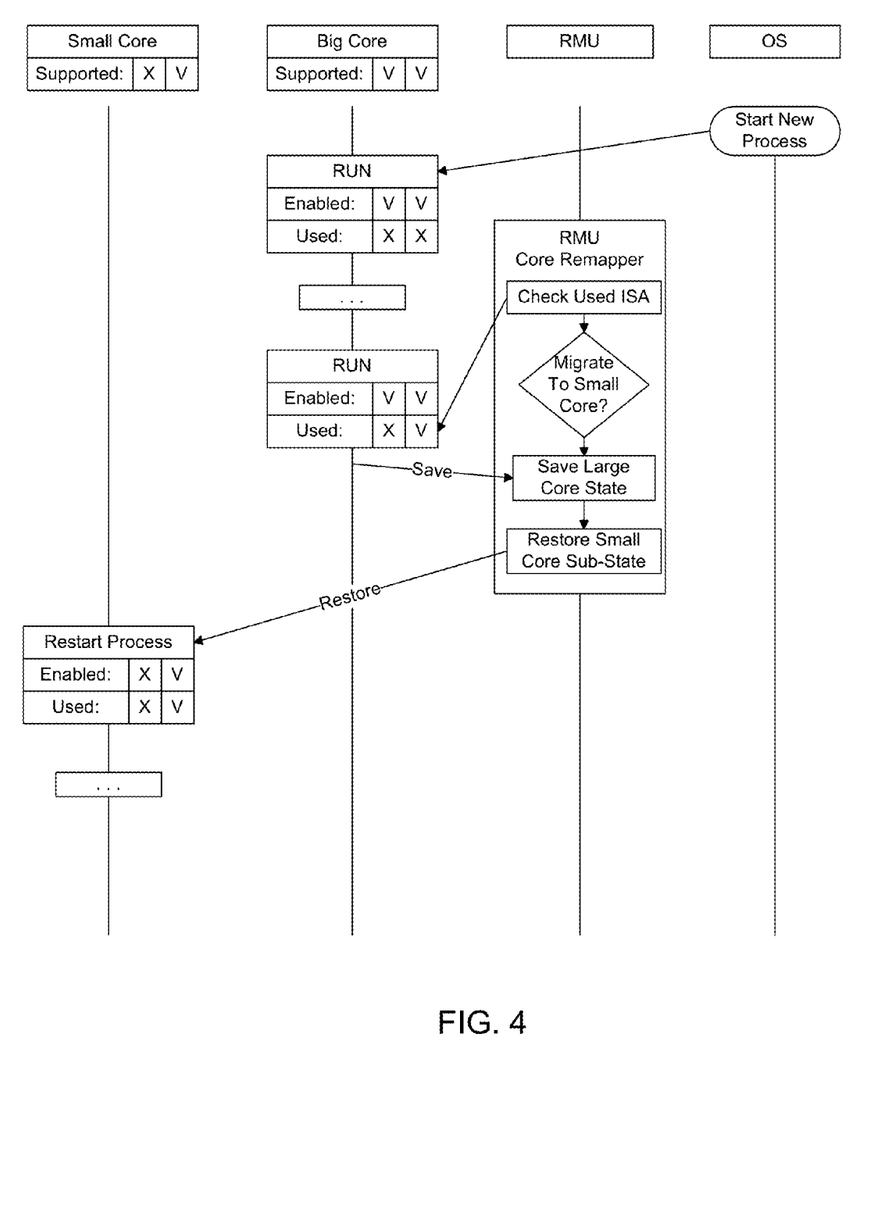
FIG. 4 is a graphical illustration of a process mapping and migration in accordance with one embodiment of the present invention.

Referring now to FIG. 4, shown is a graphical illustration of a process mapping and migration in accordance with one embodiment of the present invention. More specifically, this type of migration can be referred to as a "check used ISA—and-migrate" operation to migrate a process if the code of a process being executed is of an ISA that is supported by a target core. As seen, a new process can be scheduled by the OS to a virtual core that may execute on a large core, which can be considered a source core. Accordingly, the process begins execution on such core.

During processor operation, the RMU is regularly awoken to analyze process execution to determine whether a migration between cores is appropriate. During such analysis, assume the RMU determines that the current code does not require high performance, e.g., based on performance monitoring as described above. Accordingly, the RMU determines that the process is a potential candidate to migrate to the small core. To this end, the RMU may check a register, namely a used ISA register (which in one embodiment can be a non-architectural visible machine specific register (MSR)). This register may include one or more indicators to allow the core to track the ISA subset used by code running on it. This register will be supported by a hardware mechanism to identify the current type of executed ISA and set the relevant bit in the ISA register. If this process running on the large core uses only a subset of the ISA of the large core, and which is supported by the small core, then the RMU can decide to migrate the process to the small core. In order to enable the hardware to be aware about the type of code that is planned to be executed after an operating system context switch, select the right core type and avoid frequent core migration, the software thread context may include the ISA register. Embodiments may realize this by extending state storage structures to include the ISA register. In this case, the ISA register will be saved and restored during OS context switch.

In one embodiment, the RMU can perform a hardware context switch to cause the process to be migrated from the large core to the small core. In one embodiment, this can be implemented as follows: (a) stop code execution on the large core and disable interrupts; (b) copy the large core architectural state to RMU internal memory (note that in addition to architectural registers saved by a save instruction such as XSAVE, at least certain MSR and non-architectural visible configuration registers can also be saved); (c) restore a partial state (namely registers supported by the small core ISA) on the small core and enable interrupts; and (d) resume execution on the small core.

Note that since the large core and the small core may have different ISAs, not all of the large core resources (e.g., MSRs) will be supported by the small core. In order to enable context migration from the small core to the large core as seen in FIG. 4, the RMU can include some storage to maintain that part of the large core state that is not transferred to the small core. During execution of an XSAVE or XRESTORE instruction by the software on top the small core, the RMU may access this storage in order to fetch the resource information that is not held by the small core but is saved by the software. In order to enable the hardware to be aware about the type of code that is planned to be executed after an OS context switch to select the right core type and avoid frequent core migration, the software thread context can hold the ISA register as part of its non-architecture context. This can be done by extending the XSAVE and XRESTORE structure to include the ISA register. In this case, the ISA register will be saved and restored during an OS context switch.

Figure 5:
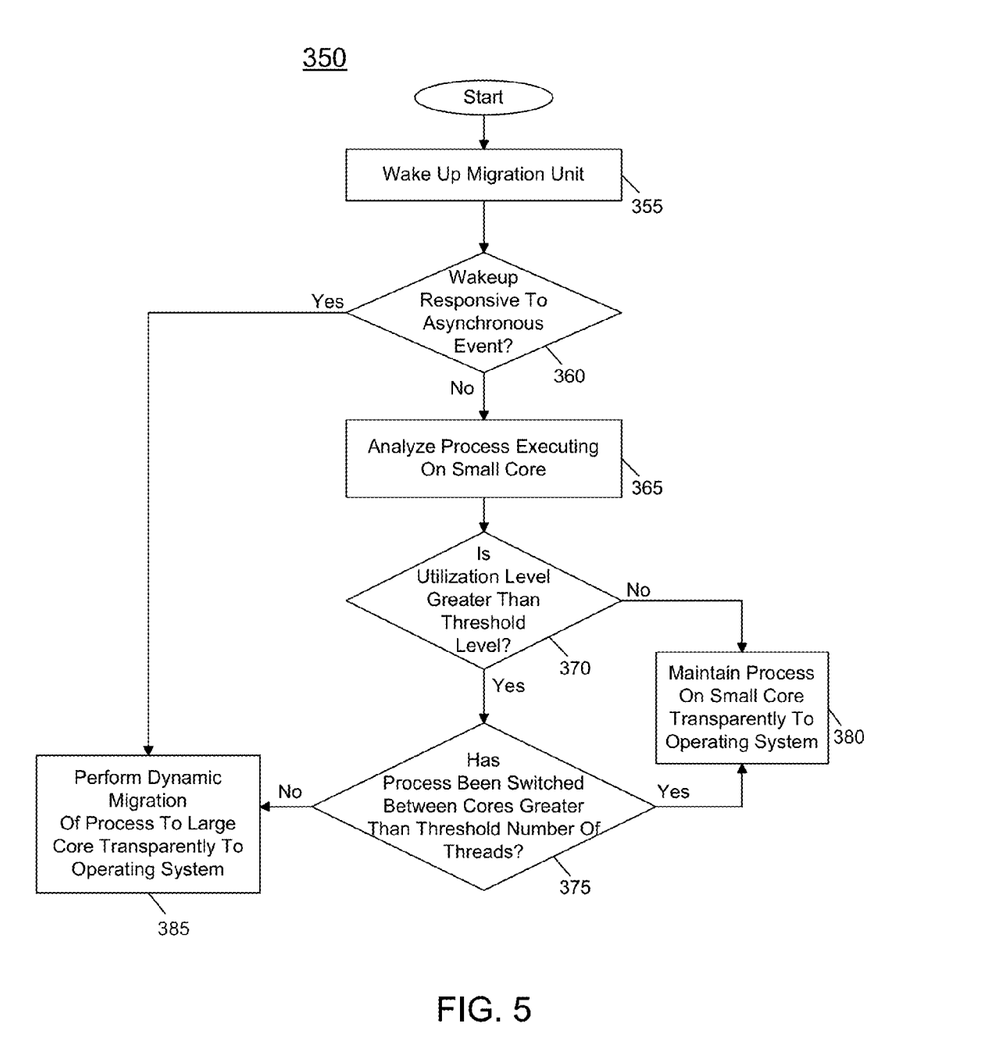
FIG. 5 is a flow diagram of a method for performing dynamic migration in accordance with another embodiment of the present invention.

Referring now to FIG. 5, shown is a flow diagram of a method for performing dynamic migration in accordance with another embodiment of the present invention. As shown in FIG. 5, method 350 may be performed by the migration unit when it is analyzing whether to cause a process executing on a small core to be migrated to a large core. As seen, method 350 can begin by waking the migration unit (block 355). Next it can be determined at diamond 360 whether the wakeup is responsive to an asynchronous event interrupt. If so, control passes to block 385 where a dynamic migration can be performed to thus migrate the process from the small core to the large core transparently to the OS. As will be discussed further below, various operations can be performed in executing this dynamic migration. In general, the state of the small core for the process can be switched over to the large core to enable continued execution of the process on the large core. Note that in the embodiment shown in FIG. 5, regardless of the type of asynchronous event that wakes up the migration unit, the result is a dynamic migration from the small core to the large core. As examples of the event types that can be received, various asynchronous triggers such as a change in core P-state, e.g., from a lower performance level to a higher performance level as initiated in an OS can be the trigger. Or, the asynchronous trigger can be an exception due to attempting to execute code on the small core having instructions that are not supported by the ISA of the small core.

Still referring to FIG. 5, if instead it is determined that the migration unit did not wake-up as a result of an asynchronous event such as an interrupt, control passes to block 365 where the migration unit can analyze the process executing on the small core. For example, as discussed above various performance monitors of the small core can be analyzed to determine whether the capabilities of the small core are suitable for the level of performance needed by the process. Based on this information, it can be determined at diamond 370 whether the utilization level is higher than a threshold level for the process. Although the scope of the present invention is not limited in this regard, in one embodiment this threshold level of utilization can correspond to a number of instructions executed per cycle over a given evaluation interval. Thus, this determination can analyze the performance monitors to determine whether the small core is highly utilized (e.g., having a high IPC) such that the small core can be considered to be compute bounded. Accordingly, performance may be better served by migrating the process to a large core.

If the determined utilization is above the threshold level, control passes to diamond 375 where it can be determined whether the process has been switched between the cores greater than a threshold number of times. Note that in some embodiments multiple threshold levels may be present to account for hysteresis. If this count value exceeds the given threshold, this indicates that for some reason the process continues to be switched back to the large core from the small core (e.g., execution of instructions of the code not supported by the small core). Accordingly, the overhead that includes the performance loss during switch between two cores types and the extra energy cost incurred in performing the migration may not be worth the effort and thus control passes to block 380 where the process can be maintained on the small core transparently to the OS.

If the number of switches between cores for this process is below the threshold number, at block 385, a dynamic migration can be performed as discussed above. If at diamond 370 the utilization level is less than the threshold level, execution of the process on the small core is appropriate and accordingly, control passes to block 380 where the process can be maintained on the small core transparently to the OS. Although shown with this particular implementation in the embodiment of FIG. 5, understand the scope of the present invention is not limited in this regard.

Figure 6:
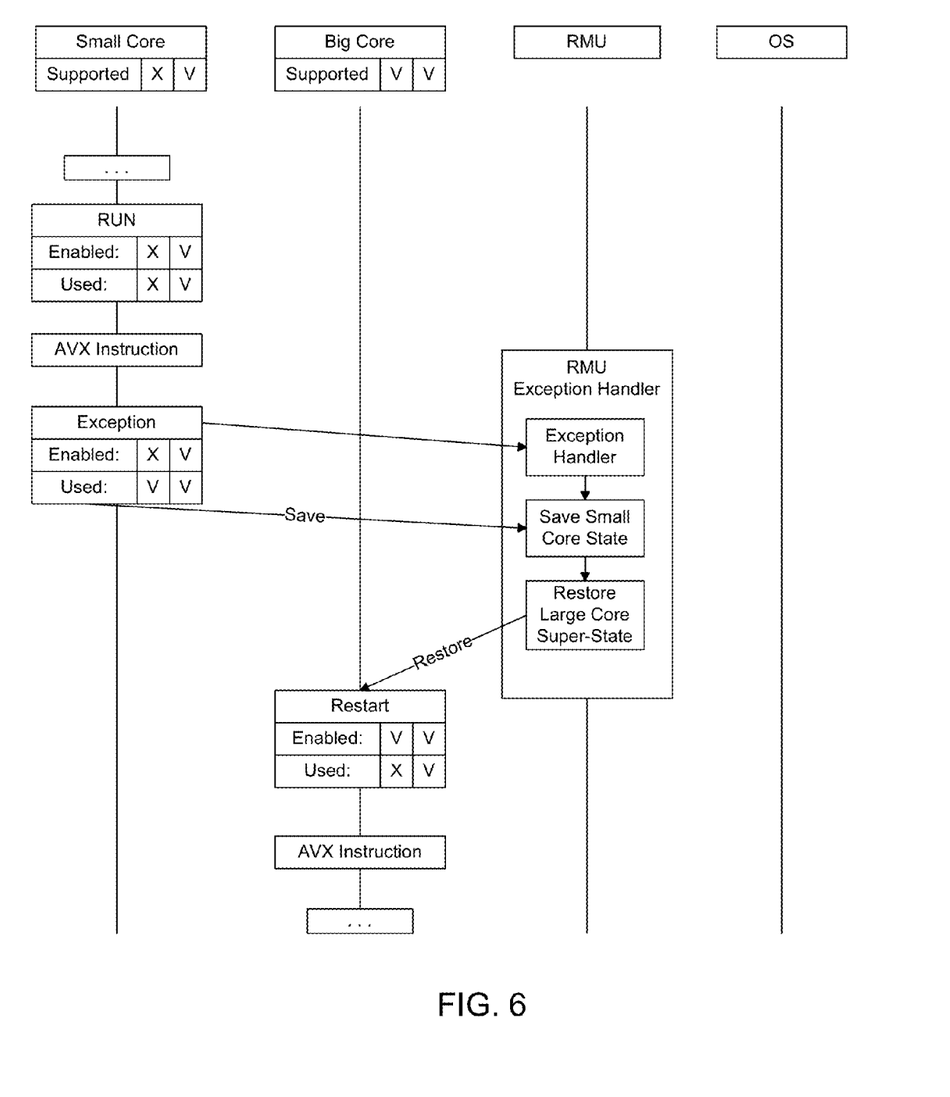
FIG. 6 is a graphical illustration of process migration from a small core to a large core in accordance with one embodiment of the present invention.

Referring now to FIG. 6, shown is a graphical illustration of process migration from a small core to a large core in accordance with one embodiment of the present invention. More specifically, this type of migration can be referred to as a "fault-and-migrate" operation. In various embodiments, the RMU can migrate a process from the small core to the large core for a number of reasons. For example, the RMU may determine that a process requires more performance; a non-supported instruction occurs during code execution on the small core; or responsive to a fault related to the large core features that are not supported by the small core (e.g., operating modes, MSRs or so forth). For example, use of a paging mode for code execution that is not supported in the small core can trigger an exception and force the migration to the large core. When such an instruction is encountered on the small core, it may issue an "invalid opcode" exception to the RMU. Responsive to this exception, the RMU migrates the process from the small core to the large core, and restarts the faulty instruction execution. It also marks the corresponding bit in the used ISA register of the large core to indicate use of the full ISA of the large core. In the example shown in FIG. 6, this unsupported instruction is an advanced vector extension (AVX) instruction set extension of an Intel™ architecture (IA) processor, although of course other instruction types may be unsupported by the small core.

Figure 7:
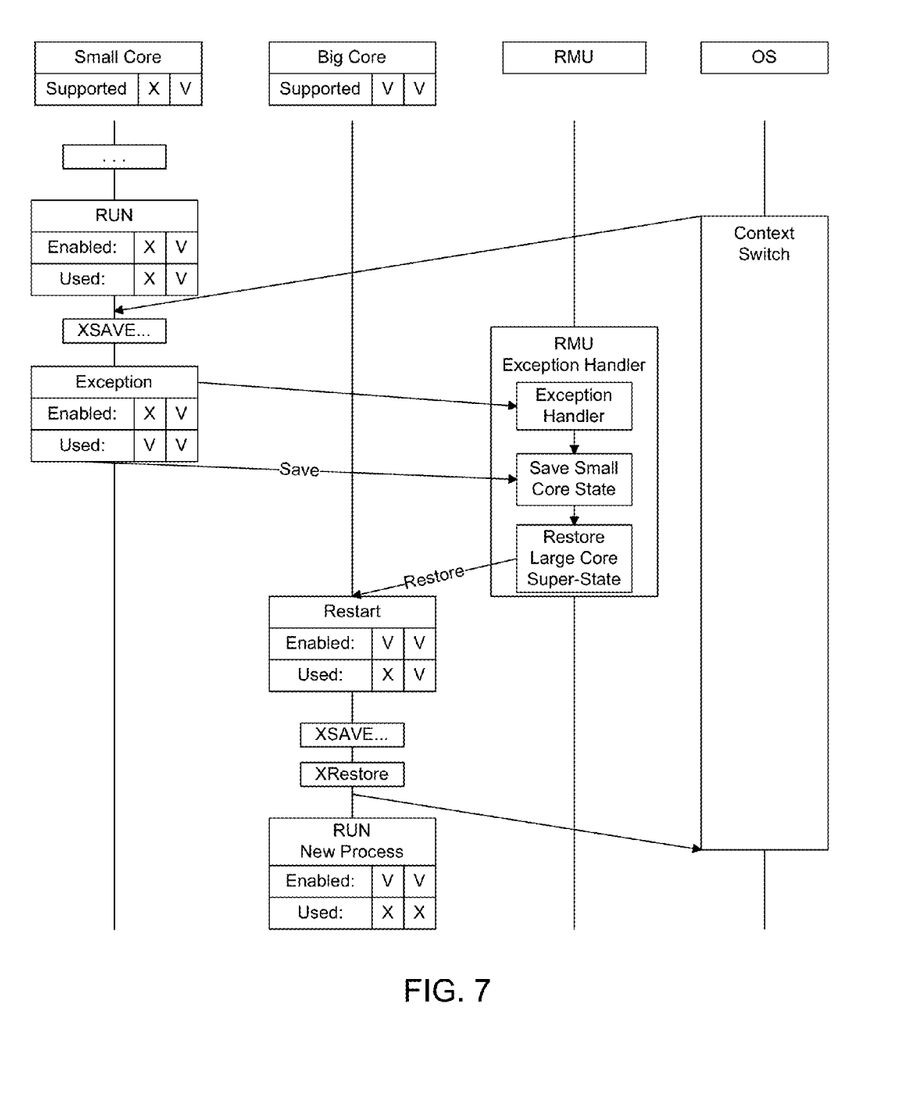
FIG. 7 is a graphical illustration of another process migration from a small core to a large core in accordance with one embodiment of the present invention.

Note that this same mechanism allows the OS to switch contexts while code runs on the small core transparently to the OS. FIG. 7 is a graphical illustration of another process migration from the small core to the large core in accordance with an embodiment of the present invention. Assume that the OS decides to switch context between a first process currently running and a second process to be switched in. As the small core is transparent to the OS, the OS issues context switching instructions in the assumption that the process is running on a large core, although it in fact is executing on a small core. As part of the context switch, the OS can seek to store registers for the large core ISA using the XSAVE instruction. However, code of this process is executing on the small core, which for purposes of discussion assume does not support the XSAVE instruction, and thus this XSAVE instruction executed on the small core results in an invalid opcode exception.

Note that the exception triggered in the small core is sent to the RMU, namely to an exception handler of the RMU, which migrates the process back to the large core, saves the small core state, and restores the corresponding large core registers including a super state (corresponding to the state of the large core that did not transfer over to the small core), and resumes execution. Now the XSAVE instruction can properly execute on the large core to cause the large core architecture state to be saved, and the OS can switch to the new second process using in part an XRESTORE instruction.

Note that the used ISA register can be reset by the RMU on a context switch, or when a new process is started. Thus the RMU periodically checks this register and based on a set of policies or heuristics, it may decide to move a process executing on the large core to the small core or vice-versa.

As described above, hardware-based context switches can be restricted if the number of such transitions exceeds a threshold. To this end, the number of times a process has transitioned between heterogeneous cores over a period of time can be maintained, e.g., in a counter array of the RMU. This array may have a plurality of counters each associated with a process to count the number of transitions between heterogeneous cores during process execution. Based on this count, the RMU can choose to leave the process on the large core, if the process is transitioning frequently between cores (e.g., based on a whether the count exceeds a threshold).

The core selection process can be optimized in some embodiments by adding a cache memory to the RMU (or associated with the RMU), where it can store an internal database of ISA used for recent processes. This database can be seen as process profiles database 146 in FIG. 1. Then when the OS switches context to a new process, the RMU can immediately check if the new process is in this database, to speed up migration to the small core, if the entry of the database indicates that only code capable of executing using the small core ISA is present.

Embodiments thus hide physical heterogeneity from the OS and enable taking advantage of heterogeneity without the need for OS support.

Figure 8:
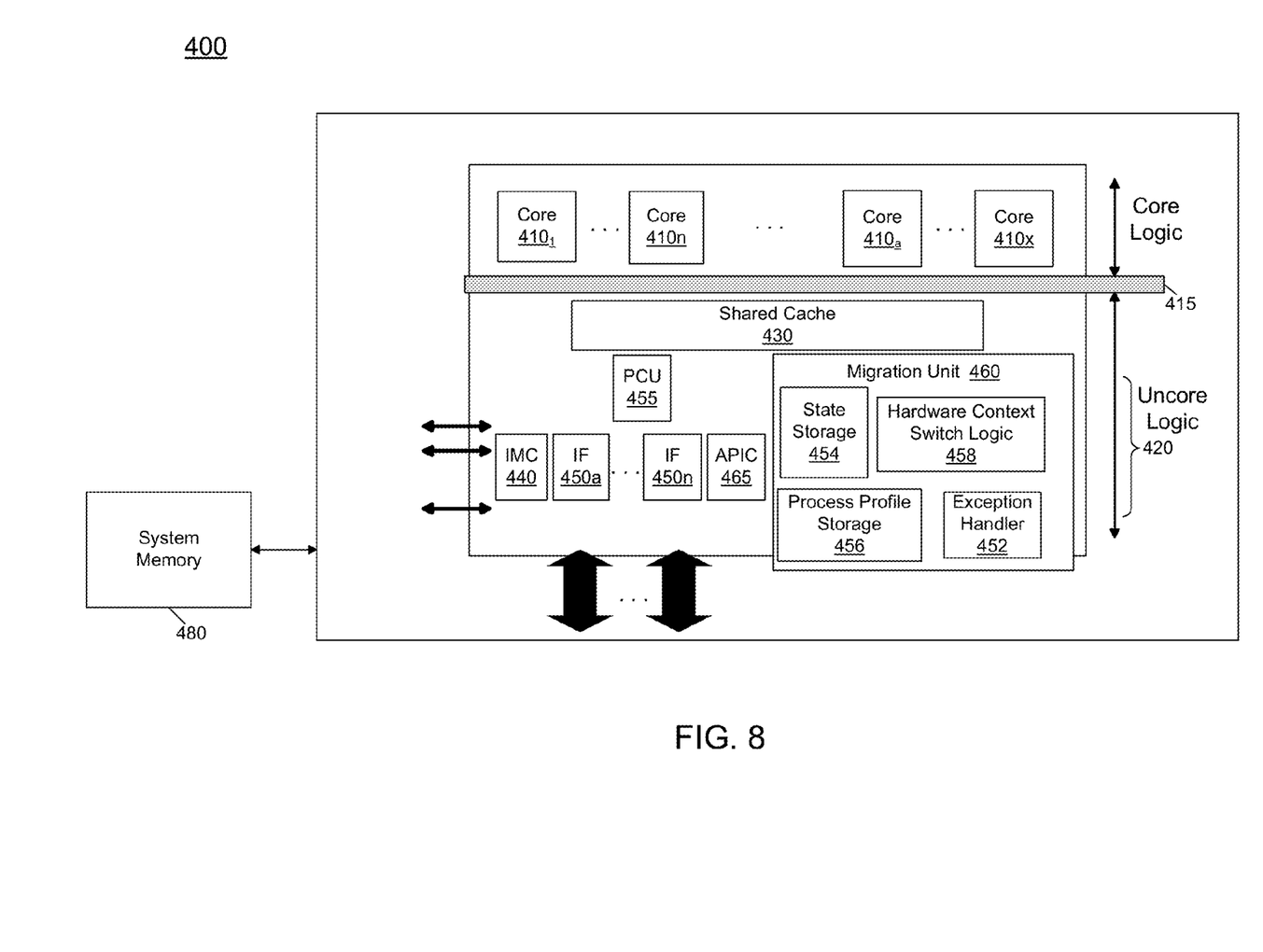
FIG. 8 is a block diagram of a processor in accordance with another embodiment of the present invention.

Referring now to FIG. 8, shown is a block diagram of a processor in accordance with another embodiment of the present invention. As shown in FIG. 8, processor 400 may be a multicore processor including a first plurality of cores $410_1$-$410n$ that can be exposed to an OS, and a second plurality of cores $410a$-$x$ that are transparent to the OS. In various embodiments, these different groups of cores can be of heterogeneous designs.

As seen, the various cores may be coupled via an interconnect 415 to a system agent or uncore 420 that includes various components. As seen, the uncore 420 may include a shared cache 430 which may be a last level cache. In addition, the uncore may include an integrated memory controller 440, various interfaces 450a-n, a power control unit 455, an advanced programmable interrupt controller (APIC) 465, and a migration unit 460. Note that the shared cache may or may not be shared between the different core types in various embodiments.

As further seen in FIG. 8, migration unit 460 can include various logic units and storages. In the embodiment shown, migration unit 460 can include an exception handler 452 that can be configured to receive and handle via hardware exceptions occurring on cores and/or other components that are transparent to an OS. In this way, this handler can respond to interrupts such as invalid opcode exceptions without OS support. In addition, migration unit 460 can include a state storage 454 that can be used to store the architectural state (and micro-architectural state) of large and small cores for purposes of context switches, including maintaining state of a large core that is not transferred to a small core on a context switch. Still further, migration unit 460 can include a process profile storage 456 that can include a table having entries each associated with a process and to indicate whether code of that process uses an ISA that is supported by the various available cores. This table can be accessed by hardware context switch logic 458 to aid in rapidly determining whether a given process can be handled by a small core.

Although shown with this particular logic in the embodiment of FIG. 8, understand the scope of the present invention is not limited in this regard. For example, the various logics of migration unit 460 can be implemented in a single logic block in other embodiments.

APIC 465 may receive various interrupts and direct the interrupts as appropriate to a given one or more cores. In some embodiments, to maintain the small cores as hidden to the OS, migration unit 460, via APIC 465 may dynamically remap incoming interrupts, each of which may include an APIC identifier associated with it, from an APIC ID associated with a large core to an APIC ID associated with a small core. The assumption is that the APIC ID that was allocated for the core type that was visible to the operating system during boot time is migrated between the core types as part of the core type switch.

With further reference to FIG. 8, processor 400 may communicate with a system memory 480, e.g., via a memory bus. In addition, by interfaces 450, connection can be made to various off-chip components such as peripheral devices, mass storage and so forth. While shown with this particular implementation in the embodiment of FIG. 8, the scope of the present invention is not limited in this regard. For example, in some embodiments a processor such as shown in FIG. 8 can further include an integrated graphics engine, which may be of a separate graphics domain.

Figure 9:
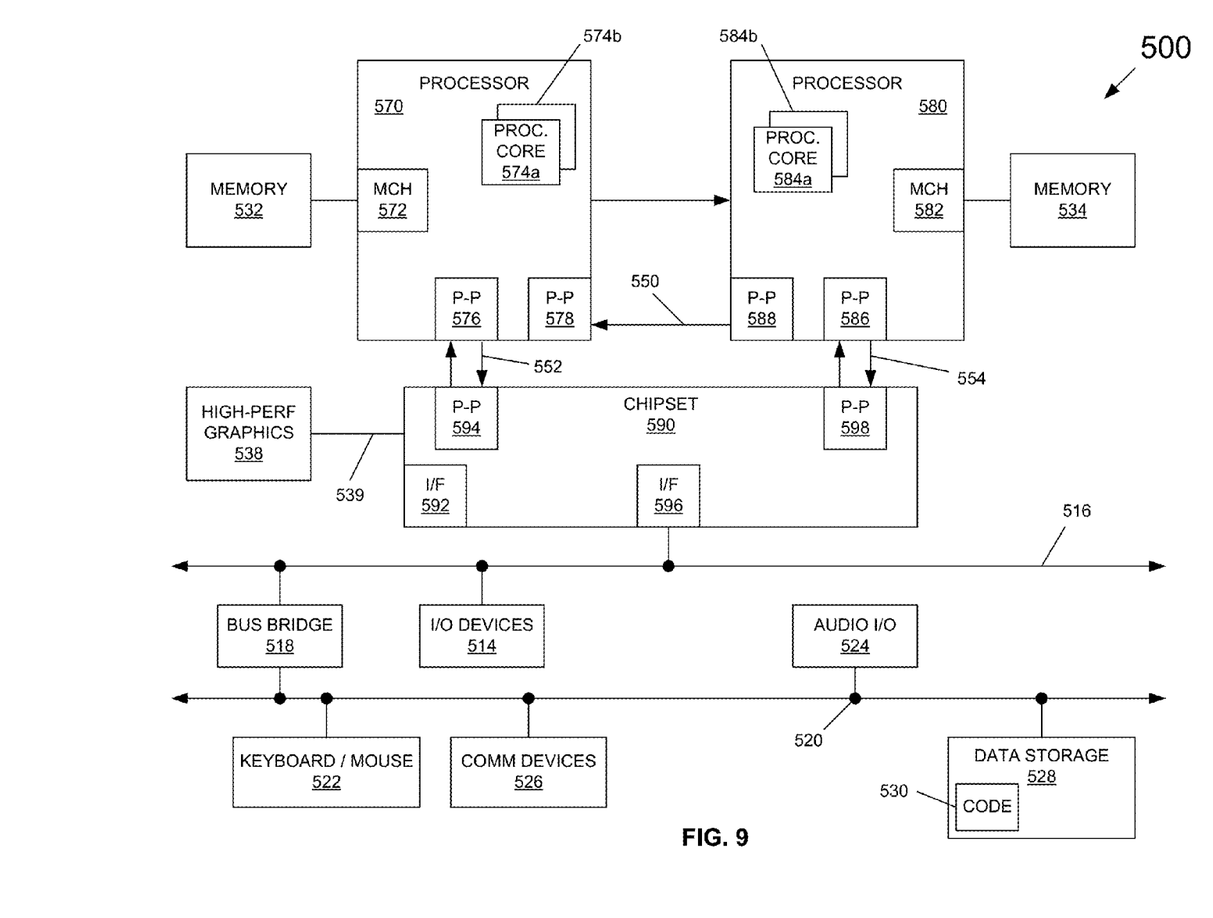
FIG. 9 is a block diagram of a system in accordance with an embodiment of the present invention.

Embodiments may be implemented in many different system types. Referring now to FIG. 9, shown is a block diagram of a system in accordance with an embodiment of the present invention. As shown in FIG. 9, multiprocessor system 500 is a point-to-point interconnect system, and includes a first processor 570 and a second processor 580 coupled via a point-to-point interconnect 550. As shown in FIG. 9, each of processors 570 and 580 may be multicore processors, including first and second processor cores (i.e., processor cores 574a and 574b and processor cores 584a and 584b) each of which can be heterogeneous cores of different ISAs, although potentially many more cores may be present in the processors. Each of the processors can include a migration unit or other logic to perform context switches in a transparent manner to an OS, as described herein.

Still referring to FIG. 9, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 9, MCH's 572 and 582 couple the processors to respective memories, namely a memory 532 and a memory 534, which may be portions of system memory (e.g., DRAM) locally attached to the respective processors. First processor 570 and second processor 580 may be coupled to a chipset 590 via P-P interconnects 552 and 554, respectively. As shown in FIG. 9, chipset 590 includes P-P interfaces 594 and 598.

Furthermore, chipset 590 includes an interface 592 to couple chipset 590 with a high performance graphics engine 538, by a P-P interconnect 539. However, in other embodiments, graphics engine 538 can be internal to one or both of processors 570 and 580. In turn, chipset 590 may be coupled to a first bus 516 via an interface 596. As shown in FIG. 9, various input/output (I/O) devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520. Embodiments can be incorporated into other types of systems including mobile devices such as a smartphone, tablet computer, ultrabook, netbook, or so forth.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A multicore processor including:
a core of a first instruction set architecture (ISA), the first ISA core visible to an operating system (OS) and including a register array having a first use register, a first enable register, and a first supported register,
the first use register including a plurality of fields each to store one or more of a plurality of indicators to identify whether a given ISA is used by a first process in execution on the first ISA core,
the first supported register including a plurality of fields each to indicate whether a corresponding hardware feature is supported by the first ISA core, and
the first enabled register including a plurality of fields each to indicate whether a corresponding hardware feature is enabled for execution of the first process;
a core of a second ISA including a second use register to store a plurality of indicators each to identify whether a given ISA is used by a process in execution on the second ISA core, wherein the second ISA core is transparent and not exposed to the OS and heterogeneous from the first ISA core; and
a hardware migration unit coupled to the first and second ISA cores to dynamically migrate the first process scheduled by the OS to the first ISA core to the second ISA core, where the dynamic migration is transparent to the OS and based at least in part on the one or more of the plurality of the indicators in the first use register or an entry in a process profile table of the hardware migration unit, wherein the process profile table is to store a plurality of entries each associated with a process and including a field to indicate an ISA used by the process.

2. The multicore processor of claim 1, wherein the hardware migration unit is to dynamically migrate the first process further based on performance monitor information obtained during execution of the first process on the first core.

3. The multicore processor of claim 1, wherein the hardware migration unit includes a state storage to store a portion of a state of the first ISA core after the dynamic migration, wherein the state portion does not have a corresponding state storage in the second ISA core.

4. The multicore processor of claim 1, wherein the hardware migration unit includes an exception handling unit to handle an exception occurring during execution of the process on the second ISA core transparently to the OS.

5. The multicore processor of claim 1, wherein the hardware migration unit includes a first counter to count a number of times the first process has been switched between the first ISA core and the second ISA core.

6. The multicore processor of claim 5, wherein the hardware migration unit is to prevent migration of the first process from the first ISA core to the second ISA core when a value of the first counter is greater than a first threshold.

7. A method comprising:
determining, in a hardware migration unit of a multicore processor, if code of a process executing on a first core is supported by a second core, wherein the second core including a second use register to store a plurality of indicators each to identify whether a given ISA is used by a process in execution on the second core, wherein the first and second cores are of the multicore processor and the second core is transparent to and hidden from an operating system (OS) and heterogeneous from the first core, including accessing a first use register of the first core to determine if the code is supported by the second core, the first core is visible to the operating system (OS) and including a first use register, a supported register and an enabled register,
the first use register to store a plurality of fields each to store an indicator to indicate whether a given ISA is used by the code,
the supported register including a plurality of fields each to indicate whether a corresponding hardware feature is supported by the first core, and
the enabled register including a plurality of fields each to indicate whether a corresponding hardware feature is enabled for execution of the process; and
if so, dynamically migrating the process from the first core to the second core, via the hardware migration unit, based at least in part on the one or more of the plurality of the indicators in the first use register or an entry in a process profile table of the hardware migration unit, wherein the process profile table is to store a plurality of entries each associated with a process and including a field to indicate an ISA used by the process.

8. The method of claim 7, further comprising determining whether the process has switched between the first core and the second core greater than a threshold number of times and dynamically migrating the process to the first core transparently to the OS if the process has been switched less than the threshold number of times.

9. The method of claim 8, further comprising maintaining the process on the first core if the process has been switched between the first core and the second core greater than the threshold number of times.

10. The method of claim 8, further comprising dynamically migrating the process from the second core to the first core if a utilization level of the second core is higher than a threshold level.

11. The method of claim 7, further comprising waking the hardware migration unit to power on responsive to a synchronous event to determine if the code is supported by the second core.

12. The method of claim 7, further comprising waking the hardware migration unit responsive to an asynchronous event.

13. The method of claim 12, further comprising dynamically migrating the process from the second core to the first core transparently to the OS responsive to the asynchronous event.

14. A system comprising:
a multicore processor including a first plurality of cores and a second plurality of cores, the second plurality of cores heterogeneous to the first plurality of cores and transparent to and hidden from an operating system (OS), wherein the first plurality of cores are visible to the operating system (OS);
a hardware-migration unit is to receive an interrupt from a second core of the second plurality of cores, including a second use register to store a plurality of indicators each to identify whether a given ISA is used by a process in execution on the second core, responsive to an instruction of a process that the second core does not support and to cause a context switch to dynamically migrate the process, via the hardware migration unit, from the second core to a first core of the first plurality of cores, including a register array having a first use register, a first enable register, and a first supported register, transparently to the OS, wherein the OS scheduled the process to the first core,
wherein the first use register including a plurality of fields each to store one or more of a plurality of indicators to identify whether a given ISA is used by a first process in execution on the first ISA core,
the first supported register including a plurality of fields each to indicate whether a corresponding hardware feature is supported by the first core, and
the first enabled register including a plurality of fields each to indicate whether a corresponding hardware feature is enabled for execution of the first process,
and wherein the dynamically migrating the process is based at least in part on the one or more of the plurality of the indicators in the first use register or an entry in a process profile table of the hardware migration unit,
wherein the process profile table is to store a plurality of entries each associated with a process and including a field to indicate an ISA used by the process; and
a dynamic random access memory (DRAM) coupled to the multicore processor.

15. The system of claim 14, wherein the hardware migration unit includes a hardware exception unit to handle an exception caused by the instruction of the process that the second core does not support transparently to the OS.

16. The system of claim 14, wherein the hardware migration unit includes:
a hardware context switch logic to cause a second process in execution on the first core to dynamically switch to the second core transparently to the OS; and
a state storage to store a portion of state of the second process during execution of the second process on the second core.

17. The system of claim 14, wherein the hardware migration unit includes a counter to count a number of switches of the process between the first and second cores, wherein the hardware migration unit is to prevent a context switch between the first core and the second core if the number of switches exceeds a threshold.

18. The system of claim 14, wherein the second plurality of cores is of a different instruction set architecture (ISA) than the first plurality of cores.

19. The system of claim 18, wherein the different ISA is partially overlapping with an ISA of the first plurality of cores.

20. The system of claim 14, wherein the second plurality of cores is of a different performance and/or power level than the first plurality of cores.

* * * * *